(12) United States Patent
Mesiti et al.

(10) Patent No.: US 7,131,510 B2
(45) Date of Patent: Nov. 7, 2006

(54) METHOD AND A SYSTEM FOR CONTROLLING THE PROPULSION OF A HYBRID MOTOR VEHICLE

(75) Inventors: Domenico Mesiti, Leini' (IT); Giancarlo Osella, Turin (IT); Attilio Porta, Turin (IT); Giovanni Ellena, Turin (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 0 days.

(21) Appl. No.: 11/137,375

(22) Filed: May 26, 2005

(65) Prior Publication Data

US 2005/0221947 A1 Oct. 6, 2005

Related U.S. Application Data

(62) Division of application No. 10/182,802, filed on Aug. 2, 2002, now Pat. No. 6,997,275.

(51) Int. Cl.
*B60K 6/00* (2006.01)

(52) U.S. Cl. .................. 180/65.2; 180/65.7; 701/113

(58) Field of Classification Search .................. None
See application file for complete search history.

(56) References Cited

U.S. PATENT DOCUMENTS

| | | | |
|---|---|---|---|
| 5,558,175 A * | 9/1996 | Sherman | 180/65.2 |
| 5,562,565 A * | 10/1996 | Moroto et al. | 477/3 |
| 5,643,119 A | 7/1997 | Yamaguchi et al. | |
| 5,697,466 A | 12/1997 | Moroto et al. | |
| 5,720,690 A | 2/1998 | Hara et al. | |
| 5,836,849 A * | 11/1998 | Mathiak et al. | 475/269 |
| 5,887,670 A | 3/1999 | Tabata et al. | |
| 5,970,937 A * | 10/1999 | Casellato et al. | 123/179.3 |
| 6,018,198 A | 1/2000 | Tsuzuki et al. | |
| 6,048,288 A | 4/2000 | Tsujii et al. | |
| 6,093,974 A | 7/2000 | Tabata et al. | |
| 6,176,807 B1 | 1/2001 | Oba et al. | |
| 6,234,930 B1 * | 5/2001 | Kaneko et al. | 475/5 |
| 6,371,889 B1 * | 4/2002 | Kuroda et al. | 477/181 |
| 6,460,500 B1 * | 10/2002 | Ooyama et al. | 123/179.3 |
| 6,502,652 B1 * | 1/2003 | Rogg | 180/65.2 |
| 6,532,926 B1 * | 3/2003 | Kuroda et al. | 123/179.4 |

FOREIGN PATENT DOCUMENTS

| | | |
|---|---|---|
| DE | 199 01 470 A | 7/1999 |
| DE | 198 14 402 A | 10/1999 |
| EP | 0 922 600 A | 6/1999 |
| WO | WO 99 22955 A | 5/1999 |

* cited by examiner

*Primary Examiner*—Christopher Bottorff
(74) *Attorney, Agent, or Firm*—Sughrue Mion, PLLC

(57) ABSTRACT

The system comprises control devices (CS) arranged to implement a stop-start function in which, during a stop stage, the internal combustion engine (1) is disconnected from the electric machine (4) and from the transmission system (2) and is switched off in first predetermined operating conditions of the vehicle (V) and then, in a subsequent start stage, is automatically restarted by an electric machine (4), operating as a motor, and is then-reconnected to the transmission system (2).

3 Claims, 1 Drawing Sheet

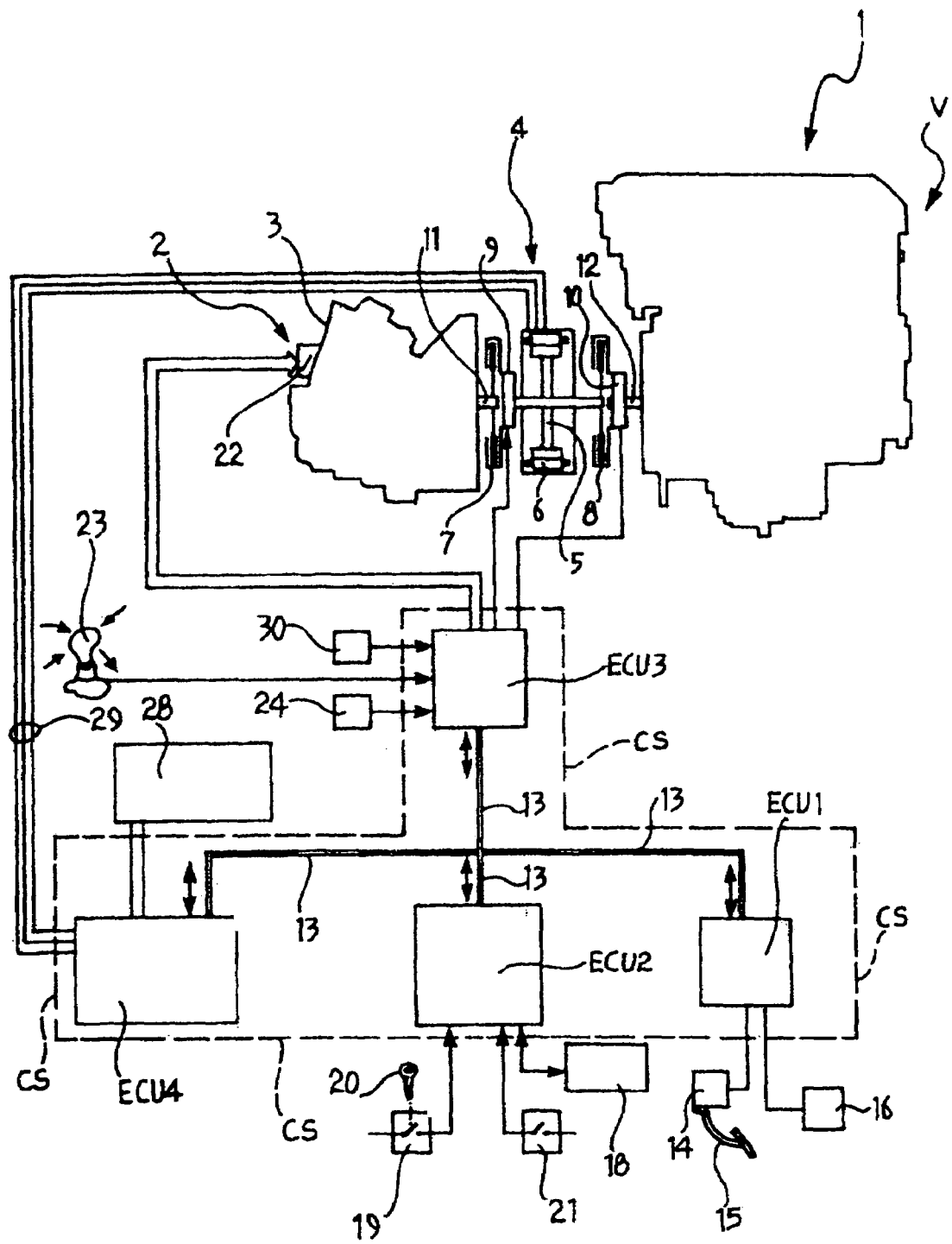

METHOD AND A SYSTEM FOR CONTROLLING THE PROPULSION OF A HYBRID MOTOR VEHICLE

This is a Divisional of U.S. National Stage application Ser. No. 10/182,802 filed Aug. 2, 2002 now U.S. Pat. No. 6,997,275. The entire disclosure of which is considered part of the disclosure of the accompanying Divisional application and is hereby incorporated by reference.

BACKGROUND OF THE INVENTION

The present invention relates to a propulsion-control system for a motor vehicle provided with:

an internal combustion engine, a transmission system comprising a transmission with discrete ratios, provided with actuator means for engaging/disengaging the ratios, a reversible electric machine which includes a rotor and a stator, is interposed between the internal combustion engine and the transmission system and is suitable for operating selectively as a generator and as an electric motor, a first clutch and a second clutch which can be operated selectively to control the connection of the rotor of the electric machine to the transmission system and to the internal combustion engine, respectively, sensor means arranged for supplying electrical signals indicative of operating conditions of the vehicle, of the internal combustion engine, and of the electric machine, and control means for controlling the internal combustion engine, the electric machine, the first and second clutches, and the actuator means for engaging/disengaging the ratios, in accordance with predetermined procedures in dependence on the signals provided by the sensor means, the control means being arranged, in particular, to implement a stop-start function in which, during a stop stage, upon the occurrence of first predetermined operating conditions of the vehicle, the internal combustion engine is disconnected from the electric machine and from the transmission system and is switched off and then, in a subsequent start stage, upon the occurrence of second predetermined operating conditions of the vehicle, is automatically restarted by means of the electric machine, operating as a motor, and is then reconnected to the transmission system.

A hybrid motor-vehicle propulsion system known from prior international patent application PCT/EP98/06922 includes an internal combustion engine, a reversible electric machine, a transmission system comprising a transmission with discrete ratios, as well as a first clutch and a second clutch which can be operated selectively to control the connection of the rotor of the electric machine to the transmission system and to the internal combustion engine, respectively. This propulsion system enables a stop-start (or "stop-and-go") function to be implemented, in which, during the stop stage, the clutch between the internal combustion engine and the electric machine is disengaged whilst the clutch between the electric machine and the transmission system remains engaged, and the internal combustion engine is switched off. During the subsequent start stage, both of the above-mentioned clutches are disengaged and the electric machine is operated as an electric motor. As soon as the speed of rotation of the electric machine exceeds a predetermined threshold value, the clutch between the internal combustion engine and the rotor of the electric machine is engaged in order to start the internal combustion engine. As soon as this has occurred, the clutch between the rotor of the electric machine and the transmission system is engaged so that the vehicle is propelled by the internal combustion engine.

SUMMARY OF THE INVENTION

The object of the present invention is to provide an improved propulsion-control system which enables optimal use to be made of the advantages of the stop-start function, reducing the impact of the implementation of this function on the driveability of the vehicle and on driving comfort.

BRIEF DESCRIPTION OF THE DRAWINGS

Further characteristics and advantages of the invention will become clear from the following detailed description, given purely by way of non-limiting example with reference to the appended drawing, which is a schematic representation of a system according to the invention.

DETAILED DESCRIPTION OF THE INVENTION

The drawing shows, schematically and partially, a motor vehicle V provided with an internal combustion engine 1 as well as a transmission system 2 including a transmission 3 with discrete ratios, in particular a transmission with gears. The transmission 3 is of the so-called "automated" or servo-assisted type, that is, it has actuator devices, for example, electro-hydraulic actuators, for engaging/disengaging the gears.

The motor vehicle V also has a reversible electric machine 4 including a rotor 5 and a stator 6. The electric machine 4 is interposed between the internal combustion engine 1 and the transmission system 2 and can operate selectively as a generator and as an electric motor.

A first clutch and a second clutch, indicated 7 and 8 in the drawing, can be controlled by means of respective actuators 9 and 10, for example, electro-hydraulic actuators, which can be operated selectively in order to control the connection of the rotor 5 of the electric machine 4 to the transmission input shaft 11 and to the shaft 12 of the internal combustion engine 1, respectively.

A control system, generally indicated CS, is associated with the above-described propulsion system. In the embodiment illustrated by way of example in the drawing, the control system CS comprises four electronic control units ECU1, ECU2, ECU3 and ECU4, interconnected by a communication network 13 operating, for example, in accordance with the CAN protocol.

The control unit ECU1 is basically a unit which supervises the management of the internal combustion engine 1. Connected to this unit are a position sensor 14 associated with the accelerator pedal 15, as well as further sensors, generally indicated 16 in the drawing, such as a sensor for detecting the rate of rotation of the shaft 12 of the engine 1, a sensor for detecting the speed of movement of the vehicle, etc.

The control unit ECU2 is for controlling general functions of the motor vehicle and for coordinating the various other control units. Connected to this unit are (amongst other things) an instrument panel 18 located on the instrumentation dashboard, a general on/off switch 19 operable, for example by means of a key 20, and a manually-operable switch 21 for selecting operation of the propulsion unit with hybrid drive or with purely electric drive, selectively.

The control unit ECU3 is intended for controlling the transmission and is connected to the actuators, generally indicated 22 in the drawing, for engaging/disengaging the gears of the transmission 3, to a manually-operable device for controlling the transmission, such as a so-called joystick 23 fitted with sensors, as well as to other sensors, generally indicated 24, such as sensors for indicating the gear ratio effectively engaged in the transmission.

The control unit ECU3 is also connected to the actuators 9 and 10 associated with the clutches 7 and 8, respectively. A manually-operable selector 30 is also connected to the unit ECU3 and can be operated by the driver in order to render operative a first operative mode in which the unit ECU3 brings about the gear changes in accordance with the commands imparted by the manual selection device 23, or a second operative mode in which the transmission is controlled completely automatically. In this second operative mode, the transmission is controlled automatically by the unit ECU3 on the basis of the signals provided by the sensors 24, as well as by the sensors 14, 16.

Finally, the control unit ECU4 supervises the control of the electric machine 4. The output of this unit is connected to the electric machine 4 by means of a three-phase line 29. A supply battery 28 is connected to the unit ECU4.

The architecture of the control system CS, which is divided into four units, is purely an example. As will be clear to experts in the art, all of the functions of the control system and, in particular, those which will be described below, may be performed and controlled by a control system having different architecture, or even in the form of a single microprocessor control unit. The control system CS is arranged to control the operation of the internal combustion engine 1, of the electric machine 4, of the clutches 7 and 8, as well as of actuator devices 22 for engaging/disengaging the gears of the transmission, in accordance with predetermined procedures in dependence on the signals provided by the sensors 14, 16 and 24 and, in the second abovementioned operative mode, by the sensors associated with the manual selection device 23.

In particular, when the automatic transmission-control procedure has been preselected by means of the selector 30, the control system CS is arranged to implement a stop-start function directed towards achieving a reduction in fuel consumption and in pollutant emissions.

This stop-start function provides for the implementation of a stop stage in which the internal combustion engine 1 is disconnected from the electric machine and from the transmission system 2 by the disengagement of the clutch 8, in predetermined first operating conditions of the vehicle, detected by means of the above-mentioned sensors, for example, in conditions in which the motor vehicle is slowing down whilst travelling in a queue, or in order to stop at traffic lights. During the stop stage, the internal combustion engine 1 is switched off under the control of the unit ECU1.

The stop stage is followed by a start stage which is started as a result of the occurrence of predetermined conditions, for example, of a command imparted by the driver, such as the operation of the accelerator pedal 15.

During the start stage, the internal combustion engine 1 is restarted by means of the electric machine 4, operating as a motor, and is then reconnected to the transmission system 2, as will be described further below.

More specifically, according to the invention, during the start stage, the control system CS is arranged first of all to bring about connection of the electric machine 4, operating as an electric motor, to the transmission system 2, after the engagement of a predetermined ratio, preferably the first ratio, in the transmission 3. The first ratio is intended to define the lowest gear or ratio.

At the beginning of the start stage, the clutch 8 is disengaged and the clutch 7 is engaged, with the predetermined ratio engaged. The electric machine 4, operating as an electric motor, thus initially takes over the propulsion of the motor vehicle. The vehicle thus moves off or accelerates again, initially with purely electric drive.

Subsequently, upon the occurrence of predetermined operating conditions, the control system CS brings about the change from the first ratio engaged to a higher ratio, for example, the second ratio. This operation is controlled, in particular, by the unit ECU3, by means of the actuators 22 associated with the transmission 3 and the clutch 7. During this change of ratio, the electric machine 4 continues to operate as an electric motor and the unit ECU3 brings about its connection to the internal combustion engine 1 by means of the clutch 8, which is engaged, in order to start the engine 1. As soon as the engine 1 has started (a condition which can be detected by the unit ECU1 by means of the sensors associated therewith), the unit ECU3 brings about re-engagement of the clutch 7 and hence reconnection of the internal combustion engine 1 to the transmission system 2.

Upon completion of the start stage, the motor vehicle is thus propelled by the internal combustion engine 1.

During the start stage, in order to bring about the change of ratio, the starting of the internal combustion engine 1, and then its connection to the transmission system, the control system CS is arranged to bring about in succession:
- disengagement of the clutch 7,
- disengagement of the predetermined ratio,
- engagement of the higher ratio and, simultaneously, engagement of the clutch 8 in order to start the engine 1; in particular, this clutch is engaged when the transmission of torque from the electric machine 4 to the transmission system 2 has been reduced to zero as a result of the completion of the disengagement of the clutch 7,
- re-engagement of the first clutch 7, after the internal combustion engine 1 has restarted.

The above-described control procedure of the start stage prevents any impact on the driveability of the vehicle or on perceived driving comfort; the driver may not even be able to detect which source of driving torque is connected to the transmission system at this stage.

Naturally, the principle of the invention remaining the same, the forms of embodiment and details of construction may be varied widely with respect to those described and illustrated purely by way of non-limiting example, without thereby departing from the scope of the invention as defined in the appended claims.

What is claimed is:

1. A method of controlling propulsion in a motor vehicle provided with:
   an internal combustion engine (1),
   a transmission system (2) comprising a transmission (3) with discrete ratios, provided with actuator means (22) for selecting the ratios,
   a reversible electric machine (4) which includes a rotor (5) and a stator (6), is interposed between the internal combustion engine (1) and the transmission system (2), and is suitable for operating as a generator and as an electric motor,
   a first clutch and a second clutch (7, 8) which can be operated selectively to control the connection of the rotor (5) of the electric machine (4) to the transmission system (2) and to the internal combustion engine (1), respectively, the method comprising the implementation of a stop-start function, including:

a stop stage in which the internal combustion engine (1) is disconnected from the electric machine (4) and from the transmission system (2) and is switched off, and a subsequent start stage in which the internal combustion engine (1) is restarted by the electric machine (4), operating as a motor, and is then reconnected to the transmission system (2);

the method being characterized in that, during the start stage:

the electric machine (4), operating as an electric motor, is connected to the transmission system (2), whilst a predetermined ratio, is engaged in the transmission (3) so that, during the start stage, the vehicle (V) is initially propelled by the electric machine (4), and a change from the predetermined ratio to a higher ratio is subsequently implemented and, during this change of ratio, while the first clutch is open, the internal combustion engine (1) is connected to the electric machine (4), operating as a motor, in order to bring about starting of the internal combustion engine (1), and then the restarted internal combustion engine (1) is connected to the transmission system (2) so that, upon completion of the start stage, the vehicle (V) is propelled by the internal combustion engine (1).

2. A method according to claim 1 in which the change of ratio is a change from first ratio to a second ratio.

3. A method according to claim 1 in which, during the start stage, the following steps are implemented in succession:

disengagement of the first clutch (7), disengagement of said predetermined ratio, engagement of the higher ratio and, simultaneously, engagement of the second clutch (8), and engagement of the first clutch (7).

* * * * *